United States Patent [19]

Holldorff

[11] 4,237,701
[45] Dec. 9, 1980

[54] METHOD OF AND APPARATUS FOR IMPROVING THE ENERGY CONSUMPTION OF ABSORPTION COOLING PLANTS

[75] Inventor: Günther Holldorff, Berlin, Fed. Rep. of Germany

[73] Assignee: Borsig GmbH, Berlin, Fed. Rep. of Germany

[21] Appl. No.: 972,377

[22] Filed: Dec. 22, 1978

[30] Foreign Application Priority Data

Dec. 23, 1977 [DE] Fed. Rep. of Germany ....... 2758547

[51] Int. Cl.³ .................. F25B 15/00; F25B 33/00
[52] U.S. Cl. ......................................... 62/476; 62/495
[58] Field of Search ............... 62/101, 495, 479, 481, 62/482, 476, 141, 148, 478

[56] References Cited

U.S. PATENT DOCUMENTS

| 2,563,574 | 8/1951 | Berry ............................ 62/476 |
| 3,426,547 | 2/1969 | Foster ........................... 62/101 |
| 3,440,832 | 4/1969 | Aronson ........................ 62/476 |
| 3,717,007 | 2/1973 | Kuhlenschmidt ............... 62/101 |

OTHER PUBLICATIONS

*Ashrae Handbook & Product Directory, 1979* Equipment, Chapter 14 "Absorption Air-Conditioning and Refrigeration Equipment".

*Primary Examiner*—Lloyd L. King
*Attorney, Agent, or Firm*—Becker & Becker, Inc.

[57] ABSTRACT

A method of improving the energy consumption of absorption cooling plants, according to which the solution residue from the evaporator of an absorption cooling plant is employed for the rectification of the vapor of the cooling medium.

8 Claims, 2 Drawing Figures

METHOD OF AND APPARATUS FOR IMPROVING THE ENERGY CONSUMPTION OF ABSORPTION COOLING PLANTS

The present invention relates to an improvement in the energy consumption of absorption cooling plants.

With absorption cooling plants, due to the not 100% rectification, always a small portion of the solvent passes with the coolant liquid into the evaporator or vaporizer. Inasmuch as the content coolant in the cooling medium-vapors from the evaporator or vaporizer is considerably less than the content in solvent in the incoming cooling medium liquid, a continuous enrichment of the solvent in the evaporator or vaporizer would occur unless special steps are taken for the return of the residual solution. The said enrichment results in a boiling delay—an increase in the evaporation temperature at the same evaporation pressure—and has a harmful effect on the operation of the plant.

With the return of the residual solution, however, a coolant-solvent-mixture with a high proportion of coolant—approximately 96%—is returned from the evaporator into the circuit of the solution and thus a concentration balance is established in the evaporator.

This residual solution current which, dependent on the conditions of operation and on the admissible delay in the boiling, will amount to about from 5 to 8% of the circulating coolant mass current, is in liquid form withdrawn from the evaporator. In this way, however, the said residual solution current does not take part in the evaporation,—generation of cooling output. On the other hand, this quantity of coolant which is contained in the residual solution has to be expelled in the expeller while heat energy is added, and has to be liquified in the condenser while withdrawing heat to the surrounding.

In view of this necessary return of the residual solution from the evaporator into the solution part, the following drawbacks occur: an increase in the energy consumption; an increase in the required heating energy by approximately 5–8%; an increase in the required cooling medium to the same extent; and an increase in the heat transfer surfaces in the expeller and condenser for conveying said additional heat quantity.

Furthermore, the quantity of the residual solution to be returned from the evaporator has to be very carefully set for full load and with partial load of the plant has to be adapted to the optimum of the circulating coolant mass flow because too much residual solution increases the requirement in heating energy, and insufficient residual solution increases the boiling delay and thus reduces the output of the absorption cooling plant. For realizing optimum conditions, a considerable number of control steps are necessary.

It is known to reduce the additional energy requirement and the inherent above mentioned consequences by providing a heat exchanger in which the residual solution is employed for cooling the liquified coolant. As a result thereof, the coolant will enter the evaporator at a lower temperature, the exchange steam quantity is reduced, and the greater evaporation enthalpy difference leads to a reduced circulating coolant mass current and somewhat again improves the energy consumption. This method, however, has the following drawbacks: since in view of the state of the art, the coolant-liquid is anyhow cooled by the coolant vapor leaving the evaporator, the low temperature of the residual solvent can be exploited only in part and only a part of the additional heating energy is compensated for.

In the process technical application of absorption cooling plants, a number of processes have become known according to which too low cooling of the coolant prior to the expansion in the evaporator is undesirable which means that a heat exchanger for the residual solvent cannot be provided.

Furthermore, at too low coolant liquid temperatures and thus at too small quantities of expansion steam or vapor, the heat transfer in the evaporator will be harmfully affected.

It is, therefore, an object of the present invention to provide a method and apparatus which will avoid all of the above drawbacks and will take advantage of the unavoidable residual solution from the evaporator in such a manner that no additional heat energy will be required.

These and other objects and advantages of the invention will appear more clearly from the following specification in connection with the accompanying drawings, in which.

Figure 1:
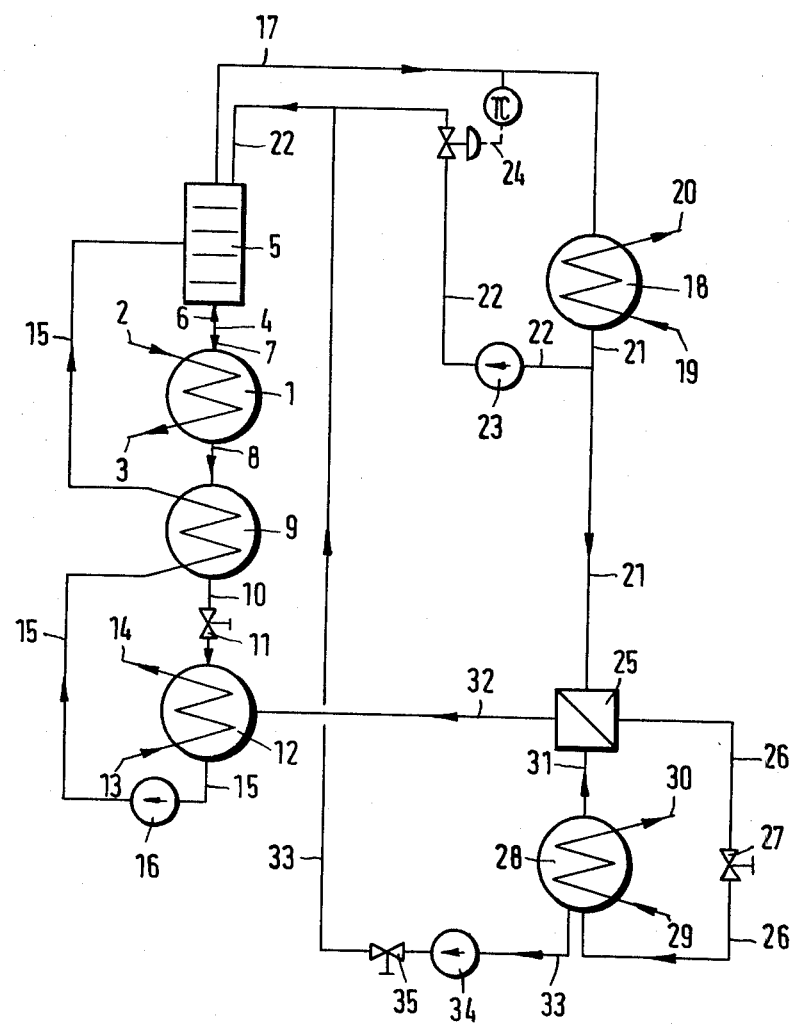
FIG. 1 represents a diagram of an absorption cooling plant with a direct supply of the residual solution together with the return flow of coolant liquid from the condenser to the head of the separating column.

The method and device according to the present invention are characterized primarily in that the residual solutions from the evaporator of an absorption cooling plant is used for rectification of the cooling medium vapor.

According to a simple way of practicing the method, the residual solution current from the evaporator is directly as the return flow by means of a pump charged to the head of the separating column arranged above the expeller.

If it is intended solely to supply the return flow of coolant liquid from the condenser for the cooling medium vapor to the head of the separating column, according to a further development of the invention, the return flow of cooling medium liquid from the line past the condenser is by means of a branching-off line to the head of the separating column cooled prior to entering said separating column in a heat exchanger by the residual solution current from the evaporator.

According to the invention, with low rectification output, exclusively the residual solution current from the evaporator is as return flow conveyed to the head of the separating column.

The advantages realized by the present invention consist primarily in that with the aid of relatively technical simple means, with absorption cooling plants, heat energy and heat transferring surfaces are saved in the expeller and in the condenser.

Inasmuch as according to the invention, the quantity of residual solution from the evaporator is by means of a pump charged to the heat of the separating column, it will be appreciated that in this way it is possible to reduce the quantity of return flow of cooling medium-liquid from the condenser as is required for the rectification, by the amount of the quantity of residual solution. According to the state of the art, the quantity of return flow is adapted in most instances by means of a cooling device. When feeding-in the residual solution, the quantity of return flow will then be reduced automatically.

Inasmuch as also the quantity of return flow from the condenser is additionally, that means without serving to generate a cooling effect, to be expelled and condensed, the heat ouput and thus also the heat transfer to the surrounding is reduced to the above mentioned 5 to 8%, i.e. to the values which would be necessary without return of the residual solution. Furthermore, the dimensioning of the quantity of residual solution in upward direction is now immaterial. Due to the sufficient quantity of residual solution, the boiling delay in the evaporator can be reduced which means that either the heat transfer surface of the evaporator can be reduced which means lower cost of investments, or the evaporation temperature can be reached whereby the heating energy requirement is somewhat reduced and consequently also the cost of operation is reduced.

If instead of the direct supply of the residual solution to the head of the separating column the return flow from the condenser to the head of the separating column is prior thereto cooled in a heat exchanger by the flow of residual solution, the quantity of return flow will likewise be reduced. In this instance, no pump for overcoming the pressure temperatures between evaporator and condenser is required provided there is no pump necessary for overcoming geodetic levels within the plant. With processes which require only a low rectification heat, and which required correspondingly small quantities of return flow from the condenser, in other words when it is possible exclusively to charge the residual solution as return flow to the separating column, the return flow pump past the condenser will not be necessary.

Referring now to the drawings in detail, the expeller, charged for instance with heating steam is connected to the branching-off conduit 4 with the separating column 5 located above the expeller 1. Cooling medium-vapor from the expeller 1 flows on one hand in the direction of the arrow 6 into the separating column 5 and on the other hand in the direction of the arrow 7, solution rich in cooling medium flows from the separating column 5 into the expeller 1. A warm solution poor in cooling medium flows through a conduit 8 in the direction of the arrow at the bottom out of the expeller 1 into a solution heat exchanger in which the said warm solution poor in cooling medium is cooled by means of a cold solution rich in cooling means. The cooled solution poor in cooling means passes through a conduit 10 and through an automatic expansion valve 11 interposed in conduit 10 into the absorber 12 cooled by cooling water, said absorber being provided with a cooled water feeding line 13 and a cool water discharging line 14. The cold solution rich in cooling means which leaves the absorber 12 through a conduit 15 is by means of a solution pump 16 pumped through the solution heat exchanger 9 and into the separating column 5. The cooling medium-vapor which leaves through a conduit 17 at the head of the separating column 5 is liquified in a condenser 18 cooled by cooling water, said condenser 18 having a cooling water feeding line 19 and a cooling water discharge line 20. The cooling medium-liquid leaves the condenser 18 through a conduit 21. The return flow quantity of cooling medium-liquid required for the rectification in the separating column 5 is by means of a pump 23 supplied through a conduit 22 branching off the conduit 21 and conveyed to the head of the separating column 5. The return quantity from the condenser 18 is conveyed by means of a temperature controlled control circuit. The main current of the cooling medium-liquid passes through the conduit 21 through a cooling medium post cooler 25 which latter has interposed an automatic expansion valve 27. The conduit 26 leads into the evaporator 28 into which a warm cooling medium carrier flows through a conduit 29 for evaporating the cooling medium-liquid; said last mentioned cooling medium-liquid flows off through a discharge line 30. The cooling medium vapor which through a conduit 31 leaves at the top of the evaporator 28 takes up heat in the cooling medium post cooler 25 and flows through a conduit 32 into the absorber 12. The residual solution which flows off through a conduit 33 at the bottom of the evaporator 28 is by means of a pump 34 through a manually or automatically actuated control member 35 for optimum adjustment of the residual solution current charged into the conduit 22 and thus onto the head of the separating column 5.

Figure 2:
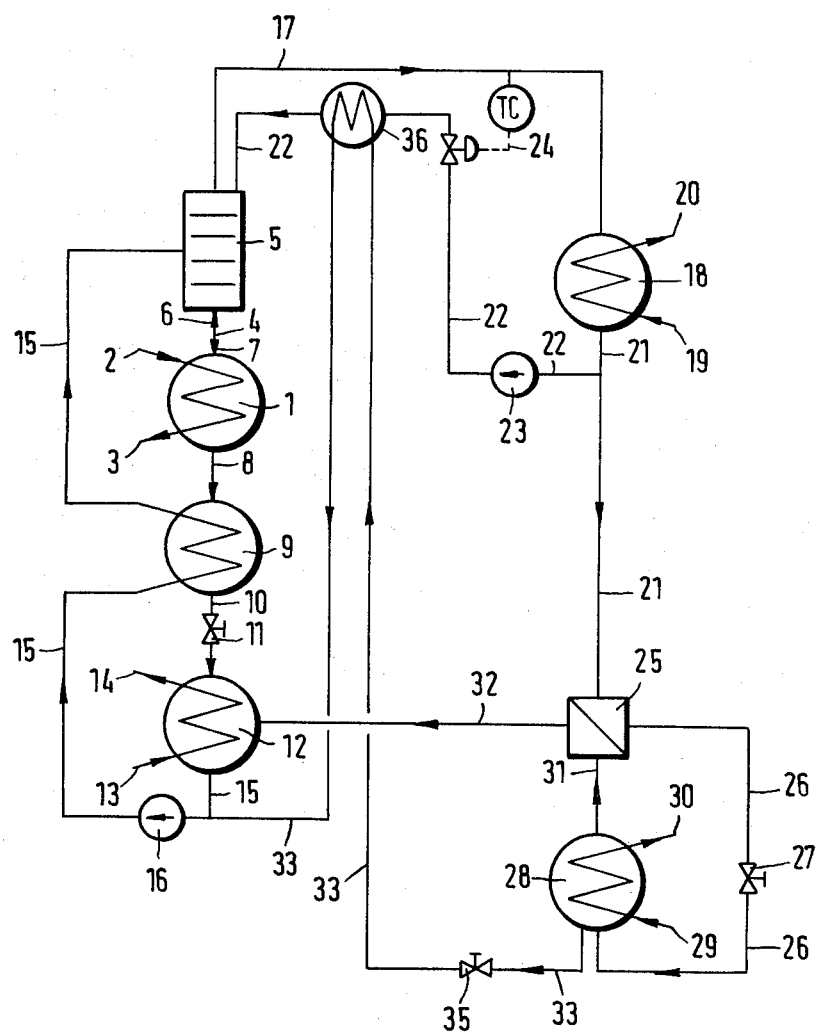
FIG. 2 shows a diagram according to which the residual solution serves for cooling the return flow from the condenser by means of a heat exchanger.

According to the diagram of FIG. 2, the residual solution from the evaporator 28 is not directly as in FIG. 1 charged through conduit 22 onto the head of the separating column 5. Instead, the residual solution is according to FIG. 2 employed for cooling the return flow from the condenser 18. This cooling is effected by a heat exchanger 36 which is interposed in conduit 22. To this end, the conduit 33 for the residual solution leads into the conduit 15 conveying the rich cooling medium flowing off from the absorber 12. With this circuit the pump 34 is not necessary.

It is, of course, to be understood that the present invention is, by no means, limited to the specific showing in the drawing, but also comprises any modifications within the scope of the appended claims.

What I claim is:

1. An absorption cooling plant which includes: an expeller adapted to receive heating steam and provided with a condensate discharge, a separating column having a first end and a second end, said first end being connected to said expeller for receiving cooling medium vapor from said expeller and to convey rich cooling medium solution from said separating column to said expeller, an absorber having an inlet and outlet for cooling water, a conduit leading from said absorber to said separating column, a solution heat exchanger interposed in said conduit, an evaporator, first conduit means connecting said separating column to said evaporator, second conduit means connecting said evaporator to said separating column, and third conduit means connecting said evaporator to said absorber.

2. An absorption cooling plant according to claim 1, which includes an additional conduit connecting said expeller with said solution heat exchanger.

3. An absorption cooling plant according to claim 1, which includes a condenser interposed in said first conduit means and connected to said separating column and said evaporator.

4. An absorption cooling plant, which includes: an expeller adapted to receive heating steam and provided with a condensate discharge, a separating column having a first end and a second end, said first end being connected to said expeller for receiving cooling medium vapor from said expeller and to convey rich cooling medium solution from said separating column to said expeller, a solution heat exchanger connected to said expeller for receiving from said expeller a warm solution poor in cooling media, said solution heat exchanger also being operable to cool said last mentioned cooling medium solution, an absorber provided with an inlet and an outlet for cooling water, a solution pump having its suction side connected to said absorber and having its pressure side connected to said solution heat exchanger for conveying a cold solution rich in cooling medium through said solution heat exchanger and into said separating column, a water-cooled condenser provided with a cooling water inlet and a cooling water outlet and provided with first conduit means for conveying cooling medium vapor from said separating column to said condenser, said condenser also communicating through second conduit means with said separating column for returning to said separating column cooling medium liquid required for the rectification in said separating column, an evaporator, third conduit means having a cooling medium post-cooler interposed therein and connecting said condenser to said evaporator for conveying the major portion of the cooling medium liquid from said condenser to said evaporator, said evaporator having an inlet for receiving a cooling medium carrier for evaporating the cooling medium liquid, and also having an outlet for discharging cooling medium carrier, an additional conduit connecting said cooling medium post-cooler to said absorber, and conduit means connecting said evaporator with said second conduit means.

5. In an absorption cooling plant operable with a cooling-medium fluid and having a residual solution therebetween as well as including an expeller, a separating column having a head portion, a condenser, an evaporator having lower-most parts, an absorber, a solution heat exchanger and a conduit for cooling-medium fluid between the condenser and a cooling-medium after-cooler which provides a branch conduit to the head portion of the separating column whereby in the branch conduit a pump, and a regulating circuit are provided functionally connected with a conduit from the separating column to the condenser and conveying cooling-medium-vapor, the improvement therewith comprising a conduit means provided at lower-most parts of the conveyor and leading into the separating column for utilization of a residual solution taken away from the evaporator for rectification of the vapor of the cooling medium to improve energy consumption of the absorption cooling plant.

6. An absorption cooling plant according to claim 5, in which a pump provided with said conduit means discharges into the branch conduit.

7. An absorption cooling plant according to claim 5, in which said conduit means leads into the heat exchanger in the branch conduit and further leads into a conduit from the absorber.

8. An absorption cooling plant according to claim 5, in which with low rectification output solely the residual solution from the evaporator is conveyed as return flow to the head portion of the separating column.

* * * * *